(12) United States Patent
Miles

(10) Patent No.: US 6,303,241 B1
(45) Date of Patent: Oct. 16, 2001

(54) WEAR PLATE RETAINER WITH MAGNETICALLY RETAINED, REPLACEABLE WEAR PLATE

(75) Inventor: David Roger Miles, 4345 Turner Road, Kelowna, British Columbia (CA), V1W 1R4

(73) Assignees: Rampage Ventures, Inc. (KY); David Roger Miles, B.C. (CA); a part interest ( * ) Notice: Subject to any disclaimer, the term of this patent is extended or adjusted under 35 U.S.C. 154(b) by 0 days.

(21) Appl. No.: 09/204,326

(22) Filed: Dec. 2, 1998

Related U.S. Application Data

(63) Continuation-in-part of application No. 09/073,405, filed on May 6, 1998, now Pat. No. 6,027,057.

(51) Int. Cl.$^7$ .................................................. B32B 33/00
(52) U.S. Cl. ......................................... 428/692; 428/900
(58) Field of Search ..................................... 428/692, 900

(56) References Cited

U.S. PATENT DOCUMENTS 3,665,355 * 5/1972 Sasaki et al. ........................... 335/306
4,529,660 * 7/1985 Heim ................................... 428/423.1

* cited by examiner

Primary Examiner—Stevan A. Resan
(74) Attorney, Agent, or Firm—Townsend and Townsend and Crew LLP; Kenneth R. Allen

(57) ABSTRACT

A wear plate retainer having upper and lower layers. The lower layer is formed of a relatively soft, shock-absorbent material and the upper layer is formed of a relatively hard, impact and abrasion resistant material. A plurality of magnets are embedded in the upper layer to removably magnetically retain a wear plate atop the upper layer. A pair of pole pieces are positioned on opposed sides of each magnet and embedded in the upper layer. The pole pieces extend above the magnet, protecting it from impact forces. The pole pieces also focus the magnetic field forces emanating from the magnet. The magnets are arranged in rows, with adjacent poles of adjacent pairs of magnets in adjacent pairs of the rows having alternate polarity. The rows are parallel to one another and extend transversely to the direction in which material flows across the wear plate.

75 Claims, 3 Drawing Sheets

WEAR PLATE RETAINER WITH MAGNETICALLY RETAINED, REPLACEABLE WEAR PLATE

REFERENCE TO RELATED APPLICATION

This is a continuation-in-part of U.S. patent application Ser. No. 09/073,405 filed May 6, 1998, now U.S. Pat. No. 6,027,057.

TECHNICAL FIELD

This application pertains to a retainer having a replaceable, magnetically retained wear plate for absorbing wear in discharge chutes, conveyors and other locations exposed to moving abrasives such as cement, sand, gravel, etc. Magnets embedded in the retainer are sandwiched between pole pieces which focus the magnetic field and protect the magnets.

BACKGROUND

Wear absorbing plates are commonly used to line chutes, hoppers, trunnions, chain runs, loading decks and other locations which are exposed to excessive wearing. For example, hardened wear plates are used to line surfaces over which cement, sand, gravel, or other abrasives flow. The objective is to reduce the rate of wear caused by such abrasives. Ordinarily, wear plates are formed of high grade steels having better abrasion resistant characteristics than the materials forming adjacent portions of the chute, hopper, trunnion, etc. The wear plate thus extends the useful life of the chute, hopper, etc.

Wear plates are normally affixed at wear points by welding, bolting, riveting, clamping or other relatively permanent means. Such forms of attachment can make it difficult, inconvenient, time consuming, labour intensive and/or expensive to remove and replace a wear plate which has worn out. Particular difficulties can arise if grinders or cutting torches are required to remove a worn out wear plate, for example if there is a hazard of fire or explosion in the adjacent surroundings, as is common in installations such as grain elevators, oil or gas refineries, saw mills, etc. Moreover, wear plates are often located in cramped working spaces which increase the difficulty of removing and replacing a worn out wear plate.

The present invention overcomes the foregoing difficulties by providing a wear plate which can be firmly magnetically retained at a wear point yet readily removed and replaced therefrom. The magnetized wear plate retainer also has impact absorbing characteristics which can improve the wear plate's capability to resist wear.

U.S. Pat. No. 4,340,616 discloses a method for decreasing surface wear by incorporating magnetic material into the surface to provide a sacrificial wear-resistant surface. For example, the wear resistant capability of a pipe which conveys an abrasive slurry can be improved. But this does not address the aforementioned difficulties encountered in removing and replacing a worn out wear plate.

SUMMARY OF INVENTION

The invention provides, in one embodiment, a wear plate retainer having upper and lower layers. The upper layer is formed of a relatively hard, impact and abrasion resistant material such as 80A durometer polyurethane material. The lower layer is formed of a relatively soft, shock-absorbent material such as 55A durometer polyurethane material. A plurality of magnets are embedded within the upper layer to removably and magnetically retain a wear plate atop the upper layer.

Pole pieces are embedded within the upper layer on opposite sides of each magnet and extending above the magnets. The pole pieces protect the magnets from impact forces and focus the magnetic field forces emanating from the magnets.

The magnets are preferably arranged in rows, with adjacent poles of adjacent pairs of magnets within adjacent rows having alternate polarity. The rows are respectively parallel to one another and extend transversely to a direction of material flow across the wear plate.

Advantageously, a plurality of shock-absorbing recesses can be formed in the lower layer.

Another embodiment of the invention requires only a less expensive, easily fabricated single layer of polyurethane material. The single layer may be either a relatively hard, impact and abrasion resistant material or a relatively soft, shock-absorbent material, depending upon which material's characteristics are preferred in the application of interest.

In a further embodiment, one may dispense with the wear plate and employ only a dual layer apparatus having magnets embedded in the lower layer. The apparatus is allowed to magnetically attach itself to a ferrous surface such as a suitable portion of a discharge chute, hopper, trunnion, etc. leaving the softer layer uppermost to cushion the impact of a fragile moving material.

DESCRIPTION

Figure 1:
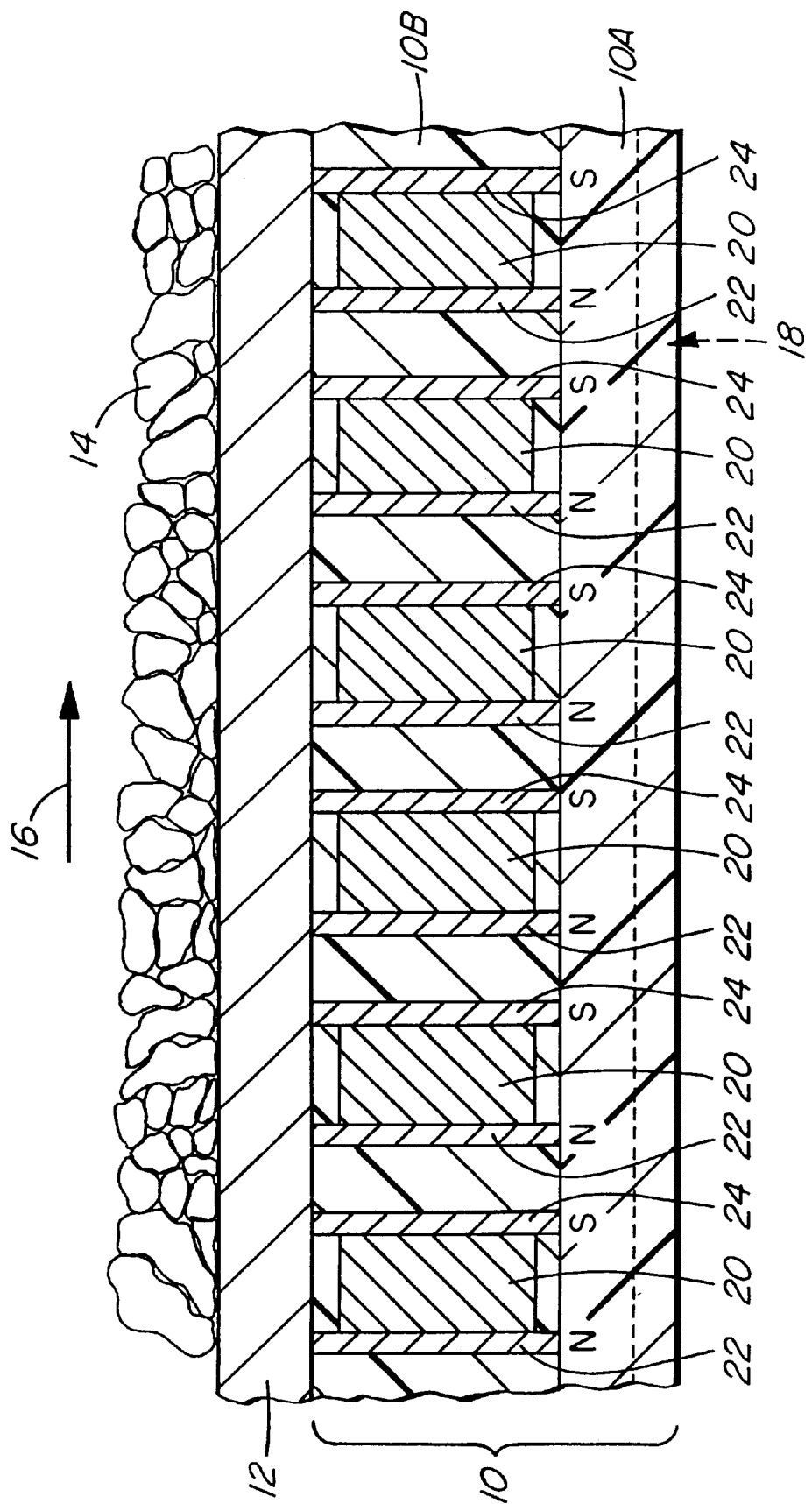
FIG. 1 is a cross-sectional side elevation view of a retainer having a replaceable, magnetically retained wear plate in accordance with the present invention.
Figure 2:
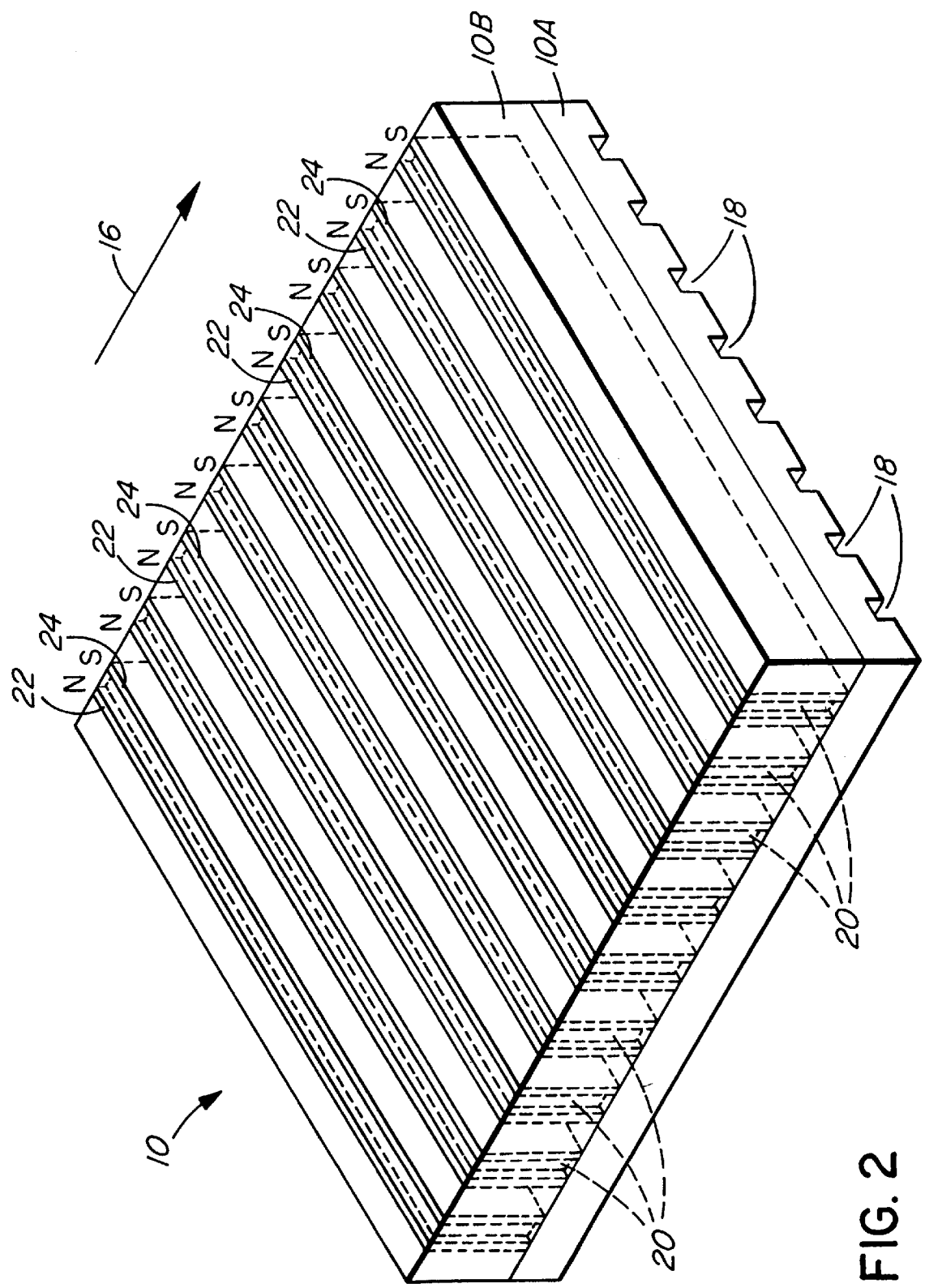
FIG. 2 is a perspective illustration of a portion of the preferred retainer, with wear plate removed.

FIGS. 1 and 2 depict a retainer 10 for removably, magnetically retaining a ferrous wear plate 12. Abrasive material 14 flows over wear plate 12 in the direction indicated by arrow 16, gradually wearing wear plate 12 to the point at which it must be replaced. Retainer 10 can be fixed in a discharge chute, hopper, trunnion or other location exposed to abrasive material 14 by bolting, screwing, welding, adhesive or other suitable attachment means. Since wear plate 12 is removably magnetically attached to retainer 10 as hereinafter explained, wear plate 12 can easily be removed and replaced when it wears out without any need for removal or replacement of retainer 10.

Retainer 10 is made up of two separate layers consisting of different types of material, namely a "first" or upper layer 10B and a "second" or lower layer 10A. Each material may be an elastomer such as polyurethane. Lower layer 10A is preferably formed of relatively soft 55A durometer polyurethane material which provides a shock absorbing capability. Upper layer 10B is preferably formed of a harder, impact and abrasion resistant 80A durometer polyurethane material. Suitable 55A and 80A durometer polyurethane material is manufactured by the chemical division of Uniroyal Inc., Naugatuck, Conn., under product designations Uniroyal™ Vibrathane™ 8050 and Uniroyal™ Vibrathane™ 8083 respectively. Optionally, a plurality of parallel, grooved recesses 18 (FIG. 2) can be formed in the bottom face of retainer 10. Recesses 18 improve the shock-absorbing capability of lower layer 10A by allowing the portions of layer 10A surrounding the respective recesses 18 to flex into the recesses.

A plurality of magnetic strips 20 (hereafter "magnets"), each having a north pole "N" and a south pole "S" are embedded within upper layer 10B. Each magnet 20 is sandwiched between a pair of impact-resistant pole pieces 22, 24. Pole pieces 22, 24 are preferably steel plates having a height dimension greater than the height dimension of magnets 20. This allows pole pieces 22, 24 to be embedded within upper layer 10B with the upper ends of pole pieces 22, 24 substantially flush with the top face of retainer 10 and with magnets 20 protectively recessed between their respective pole pieces. Pole pieces 22, 24 accordingly protect magnets 20 from impact forces to which retainer 10 can commonly be subjected during normal operation of the chute, hopper, etc. in which retainer 10 is mounted. Pole pieces 22, 24 also serve to focus the magnetic field forces emanating from magnets 20.

Within each pair of longitudinally adjacent rows of magnets, adjacent magnets in each row are oriented to alternate the polarities of that magnet pair. Thus, the south ("S") pole of each magnet 20 in one row is oriented to face the north ("N") pole of the immediately adjacent magnet in the next row, and vice versa. This orientation of magnets 20 assists in providing full magnetic field coverage over the top face of retainer 10 while minimizing "dead spots" (i.e. regions of reduced magnetic field coverage having reduced capability to magnetically attach wear plate 12). Magnets 20 may be formed of a suitable magnetic material, such as grade 5 ceramic.

As best seen in FIG. 2, magnets 20 embedded within upper layer 10B extend transversely to the direction 16 of material flow across wear plate 12. This enhances the ability of retainer 10 to magnetically resist possible sliding of wear plate 12 relative to retainer 10 due to forces imparted to wear plate 12 by heavy abrasives moving across wear plate 12 at high speed.

Retainer 10 can be made by a molding process. For example, a mold (not shown) having the desired shape may be constructed. The mold is inverted, then magnets 20 and pole pieces 22, 24 are positioned within the mold, in the same locations as described above in reference to the completed retainer 10. Impact and abrasion resistant material in liquified form is then poured into the mold over magnets 20 to form upper layer 10B. Softer, shock-absorbent material in liquified form is then poured into the mold to form lower layer 10A. A chemical bonding action occurs at the interface between the two types of material, securely bonding the two layers together. A mold cover formed with a series of ribs is then secured atop the mold, to embed the cover's ribs in the softer material and thereby form grooved recesses 18 in the bottom face of retainer 10. After the liquified material hardens, the mold is opened and the completed retainer removed therefrom.

In operation, retainer 10 is fixed in place at the wear point as aforesaid, and wear plate 12 is laid atop retainer 10 to magnetically attach wear plate 12 to retainer 10. Abrasive material 14 is then allowed to flow across wear plate 12 in the direction of arrow 16. The shock absorbent characteristics of retainer 10 assist in absorbing some of the forces generated by repeated impact of material 14 with retainer 10, somewhat reducing wear on wear plate 12 and prolonging its life. Magnets 20 embedded within retainer 10 are protected from being damaged by such impact forces by the aforementioned recessing of magnets 20 within the hard material forming upper layer 10B and by sandwiching each magnet between a protective pair of steel plate pole pieces 22, 24.

If wear plate 12 becomes worn out, it can be replaced quickly, easily and safely by inserting the tip of a pry bar (not shown) between the magnetically attached faces of retainer 10 and wear plate 12 and applying a downward force to the pry bar so as to break the force of magnetic attraction exerted by magnets 20 and lift wear plate 12 clear of upper layer 10B. The worn out wear plate 12 is then removed and a new wear plate laid atop retainer 10 to magnetically attach the new wear plate to the retainer. The pry bar can be inserted from any side of retainer 10, thus enabling a workman to perform the removal operation from the most conveniently accessible location.

The invention significantly reduces the time required to replace a worn out wear plate, thus reducing equipment down time, and reducing costs. The need for skilled labour and specialized removal equipment is also reduced, as is the potential for damage or injury due to spark or flame hazards during the removal operation. Further, less expensive wear plate materials can be used, because worn out wear plates can be replaced quickly and easily with the aid of the invention. By contrast, prior art wear plates are commonly made of relatively expensive longer lasting materials, due in part to the comparatively high cost of removing and replacing such wear plates.

Figure 3:
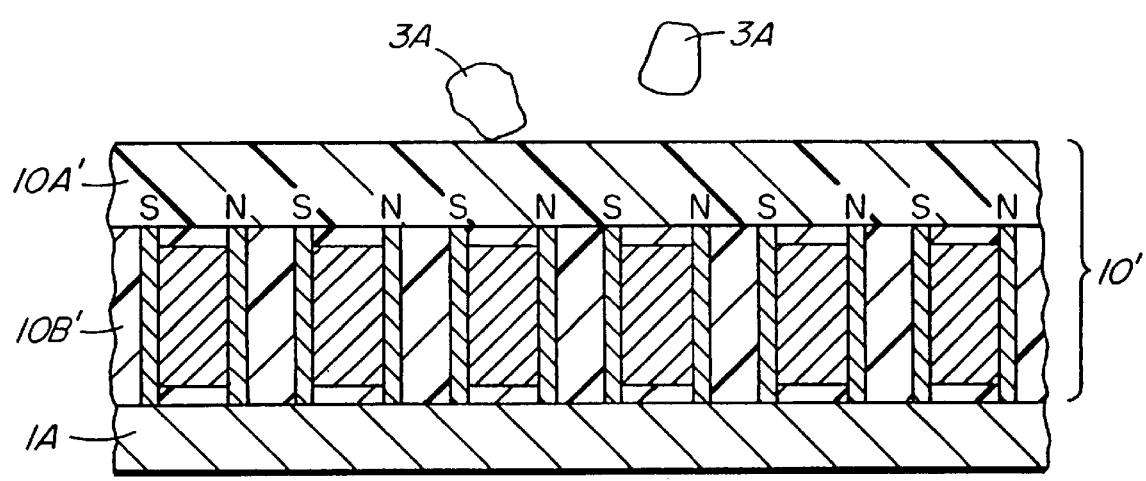
FIG. 3 is a cross-sectional side elevation view of an alternate embodiment of the invention which does not require a wear plate.

In some circumstances it may be preferable to dispense with wear plate 12. For example, in the nickel smelting industry, relatively fragile nickel "pucks" are transported via conveyors, hoppers, chutes, etc. The pucks can be damaged if they are allowed to strike a non-absorptive surface such as ferrous wear plate 12. FIG. 3 depicts an alternate embodiment of the invention which overcomes this problem by eliminating wear plate 12. Instead of fixing retainer 10' in place by bolting, etc. as described above, retainer 10' is inverted as shown in FIG. 3 to allow the harder layer 10B' to magnetically attach itself to a ferrous surface 1A such as a suitable portion of a discharge chute, hopper, trunnion, etc. This leaves the softer layer 10A' uppermost to cushion the impact of fragile material 3A. Although softer layer 10A' is not as well suited to resist impact or abrasion as is harder layer 10B', it may in some cases be preferable to invert retainer 10' as aforesaid to better exploit the shock absorbing capability of softer layer 10A', for example in transporting fragile materials as described above.

As will be apparent to those skilled in the art in the light of the foregoing disclosure, many alterations and modifications are possible in the practice of this invention without departing from the spirit or scope thereof. For example, instead of embedding magnets 20 in the harder 80A dutrometer material one could reverse the two layers and embed magnets 20 in the softer 55A durometer material so as to better exploit the shock absorbing capability of the softer material in particular situations. As another example, although it will usually be preferable to employ a dual layer retainer to obtain the combined benefits of impact and abrasion resistance (via the harder 80A durometer material) and shock absorption (via the softer 55A durometer material), it will not always be necessary to form retainer 10 (or 10') with two layers 10A and 10B (or 10A' and 10B'). In some cases it will be sufficient to eliminate either one of the two layers. Thus, a single layer of harder 80A durometer material with magnets 20 embedded therein can be employed if impact and abrasion resistance are primary requisites, with shock absorption being relatively unimportant. Conversely, a single layer of softer 55A durometer material with magnets 20 embedded therein can be employed if shock absorption is a primary requisite, with impact and abrasion resistance being relatively unimportant. In either case, single layer retainers will be less expensive and easier to fabricate than dual layer retainers of the same size. Accordingly, the scope of the invention is to be construed in accordance with the substance defined by the following claims.

What is claimed is:

1. A wear plate retainer comprising:
   (a) a first layer and a second layer, said first layer having a top surface, said first layer formed of an impact and abrasion resistant material and said second layer formed of a shock-absorbent material;
   (b) a plurality of magnets embedded within said first layer to removably magnetically retain a lower surface of a wear plate atop said first layer top surface, and
   (c) for each one of said magnets, a pair of pole pieces embedded within said first layer, said pole pieces respectively positioned on opposed sides of said magnet and extending above said magnet.

2. A wear plate retainer as defined in claim 1, further comprising a plurality of shock-absorbing recesses formed in said second layer.

3. A wear plate retainer as defined in claim 1, wherein said magnets are arranged in a plurality of rows, with adjacent poles of adjacent pairs of magnets within adjacent pairs of said rows having alternate polarity.

4. A wear plate retainer as defined in claim 3, wherein said rows are respectively parallel to one another and extend transversely to a direction of material flow across said wear plate.

5. A wear plate retainer as defined in claim 3, wherein said pole pieces have upper ends substantially flush with a top face of said first layer.

6. A wear plate retainer as defined in claim 1, wherein said second layer is formed of 55A durometer polyurethane material and said first layer is formed of 80A durometer polyurethane material.

7. A wear plate retainer as defined in claim 1, wherein said shock-absorbent material and said impact and abrasion resistant material are elastomeric materials.

8. A method of retaining a wear plate in position for passage of abrasive material over said wear plate, comprising:
   (a) forming a first retainer layer of an impact and abrasion resistant material atop a second retainer layer formed of a shock-absorbent material;
   (b) embedding a plurality of magnets within said first layer; and
   (c) placing said wear plate atop said first layer for magnetic retention of said wear plate in said position by said magnets.

9. A method as defined in claim 8, further comprising, for each one of said magnets, embedding a pair of pole pieces within said first layer on opposed sides of said magnet and extending above said magnet.

10. A method as defined in claim 9, further comprising forming a plurality of shock-absorbing recesses in said second layer.

11. A method as defined in claim 9, further comprising arranging said magnets in a plurality of rows, with adjacent poles of adjacent pairs of magnets within adjacent pairs of said rows having alternate polarity.

12. A method as defined in claim 11, further comprising arranging said rows respectively parallel to one another and extending transversely to a direction of flow of said abrasive material across said wear plate.

13. A method as defined in claim 11, further comprising positioning said pole pieces with upper ends of said pole pieces substantially flush with a top face of said first layer.

14. A method as defined in claim 9, further comprising forming said second layer of 55A durometer polyurethane material and forming said first layer of 80A durometer polyurethane material.

15. A method as defined in claim 9, further comprising forming said first layer of an elastomeric material and forming said second layer of an elastomeric material.

16. A wear plate retainer comprising:
   (a) an impact and abrasion resistant material having a plurality of magnets embedded within said material; and
   (b) for each one of said magnets, a pair of pole pieces embedded within said first layer, said pole pieces respectively positioned on opposed sides of said magnet and extending above said magnet.

17. A wear plate retainer as defined in claim 16, further comprising a plurality of shock-absorbing recesses formed in said material.

18. A wear plate retainer as defined in claim 16, wherein said magnets are arranged in a plurality of rows, with adjacent poles of adjacent pairs of magnets within adjacent pairs of said rows having alternate polarity.

19. A wear plate retainer as defined in claim 18, wherein said rows are respectively parallel to one another and extend transversely to a direction of material flow across said wear plate.

20. A wear plate retainer as defined in claim 18, wherein said pole pieces have upper ends substantially flush with a top face of said first layer.

21. A wear plate retainer as defined in claim 16, wherein said material is 55A durometer polyurethane material.

22. A wear plate retainer as defined in claim 16, wherein said material is an elastomeric material.

23. A wear plate retainer comprising:
   (a) a shock-absorbent material having a plurality of magnets embedded within said material; and
   (b) for each one of said magnets, a pair of pole pieces embedded within said first layer, said pole pieces respectively positioned on opposed sides of said magnet and extending above said magnet.

24. A wear plate retainer as defined in claim 23, further comprising a plurality of shock-absorbing recesses formed in said material.

25. A wear plate retainer as defined in claim 23, wherein said magnets are arranged in a plurality of rows, with adjacent poles of adjacent pairs of magnets within adjacent pairs of said rows having alternate polarity.

26. A wear plate retainer as defined in claim 25, wherein said rows are respectively parallel to one another and extend transversely to a direction of material flow across said wear plate.

27. A wear plate retainer as defined in claim 25, wherein said pole pieces have upper ends substantially flush with a top face of said first layer.

28. A wear plate retainer as defined in claim 23, wherein said material is 80A durometer polyurethane material.

29. A wear plate retainer as defined in claim 23, wherein said material is an elastomeric material.

30. A method of retaining a wear plate in position for passage of abrasive material over said wear plate, comprising:
   (a) forming a layer of an polyurethane material;
   (b) embedding a plurality of magnets within said polyurethane material;
   (c) placing said wear plate atop said polyurethane material for magnetic retention of said wear plate in said position by said magnets; and, (d) for each one of said magnets, embedding a pair of pole pieces within said material on opposed sides of said magnet and extending above said magnet.

31. A method as defined in claim 30, further comprising forming a plurality of shock-absorbing recesses in said polyurethane material.

32. A method as defined in claim 30, further comprising arranging said magnets in a plurality of rows, with adjacent poles of adjacent pairs of magnets within adjacent pairs of said rows having alternate polarity.

33. A method as defined in claim 32, further comprising arranging said rows respectively parallel to one another and extending transversely to a direction of flow of said abrasive material across said wear plate.

34. A method as defined in claim 32, further comprising positioning said pole pieces with upper ends of said pole pieces substantially flush with a top face of said polyurethane material.

35. A method as defined in claim 30, wherein said polyurethane material is 55A durometer polyurethane material.

36. A method as defined in claim 30, wherein said polyurethane material is 80A durometer polyurethane material.

37. Apparatus comprising:
(a) a first layer and a second layer, said first layer having a top surface, said first layer formed of a shock-absorbent material and said second layer formed of an impact and abrasion resistant material;
(b) a plurality of magnets embedded within said second layer, and
(c) for each one of said magnets, a pair of pole pieces embedded within said second layer, said pole pieces respectively positioned on opposed sides of said magnet and extending above said magnet.

38. Apparatus as defined in claim 37, further comprising a plurality of shock-absorbing recesses formed in said second layer.

39. Apparatus as defined in claim 37, wherein said magnets are arranged in a plurality of rows, with adjacent poles of adjacent pairs of magnets within adjacent pairs of said rows having alternate polarity.

40. Apparatus as defined in claim 39, wherein said rows are respectively parallel to one another and extend transversely to a direction of material flow across said apparatus.

41. Apparatus as defined in claim 39, wherein said pole pieces have upper ends substantially flush with a top face of said second layer.

42. Apparatus as defined in claim 37, wherein said first layer is formed of 55A durometer polyurethane material and said second layer is formed of 80A durometer polyurethane material.

43. Apparatus as defined in claim 37, wherein said shock-absorbent material and said impact and abrasion resistant material are elastomeric materials.

44. A method of cushioning fragile moving materials comprising:
(a) forming a first layer of a shock-absorbent material;
(b) forming a second layer of an impact and abrasion resistant material beneath said first layer;
(c) embedding a plurality of magnets within said second layer;
(d) placing said second layer on a ferrous surface over which said fragile materials are to be moved, to magnetically adhere said second layer to said ferrous surface and to position said first layer to cushion impacts of said fragile materials against said first layer, and
(e) for each one of said magnets, embedding a pair of pole pieces within said second layer on opposed sides of said magnet and extending above said magnet.

45. A method as defined in claim 44, further comprising arranging said magnets in a plurality of rows, with adjacent poles of adjacent pairs of magnets within adjacent pairs of said rows having alternate polarity.

46. A method as defined in claim 45, further comprising arranging said rows respectively parallel to one another and extending transversely to a direction of flow of said fragile material.

47. A method as defined in claim 45, further comprising positioning said pole pieces with upper ends of said pole pieces substantially flush with a bottom face of said second layer.

48. A method as defined in claim 44, further comprising forming said first layer of 55A durometer polyurethane material and forming said second layer of 80A durometer polyurethane material.

49. A method as defined in claim 44, further comprising forming said first layer of an elastomeric material and forming said second layer of an elastomeric material.

50. Apparatus comprising:
(a) an impact and abrasion resistant material having a plurality of magnets embedded within said material to removably magnetically attach said apparatus to a ferrous object, and
(b) for each one of said magnets, a pair of pole pieces embedded within said material, said pole pieces respectively positioned on opposed sides of said magnet and extending above said magnet.

51. Apparatus as defined in claim 50, further comprising a plurality of shock-absorbing recesses formed in said material.

52. Apparatus as defined in claim 50, wherein said magnets are arranged in a plurality of rows, with adjacent poles of adjacent pairs of magnets within adjacent pairs of said rows having alternate polarity.

53. Apparatus as defined in claim 52, wherein said rows are respectively parallel to one another and extend transversely to a direction of material flow across said apparatus.

54. Apparatus as defined in claim 52, wherein said pole pieces have upper ends substantially flush with a top face of said material.

55. Apparatus as defined in claim 50, wherein said material is 55A durometer polyurethane material.

56. Apparatus as defined in claim 50, wherein said material is an elastomeric material.

57. Apparatus comprising:
(a) a shock-absorbent material having a plurality of magnets embedded within said material to removably magnetically attach said apparatus to a ferrous object; and
(b) for each one of said magnets, a pair of pole pieces embedded within said material, said pole pieces respectively positioned on opposed sides of said magnet and extending above said magnet.

58. Apparatus as defined in claim 57, further comprising a plurality of shock-absorbing recesses formed in said material.

59. Apparatus as defined in claim 57, wherein said magnets are arranged in a plurality of rows, with adjacent poles of adjacent pairs of magnets within adjacent pairs of said rows having alternate polarity.

60. Apparatus as defined in claim 59, wherein said rows are respectively parallel to one another and extend transversely to a direction of material flow across said apparatus.

61. Apparatus as defined in claim 59, wherein said pole pieces have upper ends substantially flush with a top face of said material.

62. Apparatus as defined in claim 57, wherein said material is 80A durometer polyurethane material.

63. Apparatus as defined in claim 57, wherein said material is an elastomeric material.

64. A method of resisting abrasion of a ferrous object by material passing over said object, comprising:

(a) forming a layer of a shock-absorbent material;

(b) embedding a plurality of magnets within said material;

(c) placing said layer on said object, to magnetically adhere said layer to said object and to position said layer for passage of said material over said layer; and (d) for each one of said magnets, embedding a pair of pole pieces within said layer on opposed sides of said magnet and extending above said magnet.

65. A method as defined in claim 64, further comprising arranging said magnets in a plurality of rows, with adjacent poles of adjacent pairs of magnets within adjacent pairs of said rows having alternate polarity.

66. A method as defined in claim 65, further comprising arranging said rows respectively parallel to one another and extending transversely to a direction of flow of said material.

67. A method as defined in claim 65, further comprising positioning said pole pieces with opposed ends of said pole pieces respectively substantially flush with top and bottom faces of said layer.

68. A method as defined in claim 64, further comprising forming said layer of 55A durometer polyurethane material.

69. A method as defined in claim 64, further comprising forming said layer of an elastomeric material.

70. A method of resisting abrasion of a ferrous object by material passing over said object, comprising:

(a) forming a layer of an impact and abrasion resistant material;

(b) embedding a plurality of magnets within said material;

(c) placing said layer on said object, to magnetically adhere said layer to said object and to position said layer for passage of said material over said layer; and (d) for each one of said magnets, embedding a pair of pole pieces within said layer on opposed sides of said magnet and extending above said magnet.

71. A method as defined in claim 70, further comprising arranging said magnets in a plurality of rows, with adjacent poles of adjacent pairs of magnets within adjacent pairs of said rows having alternate polarity.

72. A method as defined in claim 71, further comprising arranging said rows respectively parallel to one another and extending transversely to a direction of flow of said material.

73. A method as defined in claim 71, further comprising positioning said pole pieces with opposed ends of said pole pieces respectively substantially flush with top and bottom faces of said layer.

74. A method as defined in claim 70, further comprising forming said layer of 80A durometer polyurethane material.

75. A method as defined in claim 70, further comprising said layer of an elastomeric material.

\* \* \* \* \*